June 4, 1940.  M. C. HJELTE ET AL  2,203,627
FRUIT CUTTING MACHINE
Filed Nov. 30, 1938  5 Sheets-Sheet 4
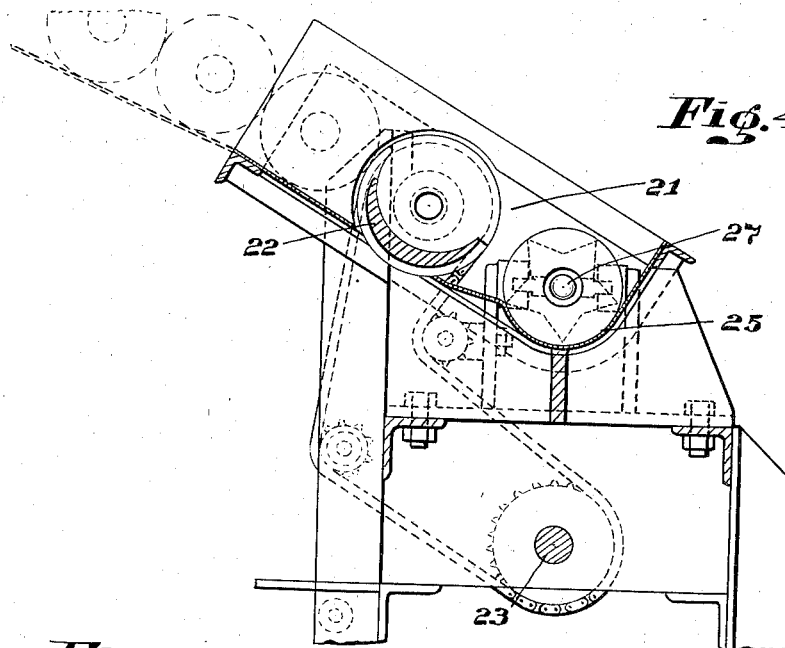
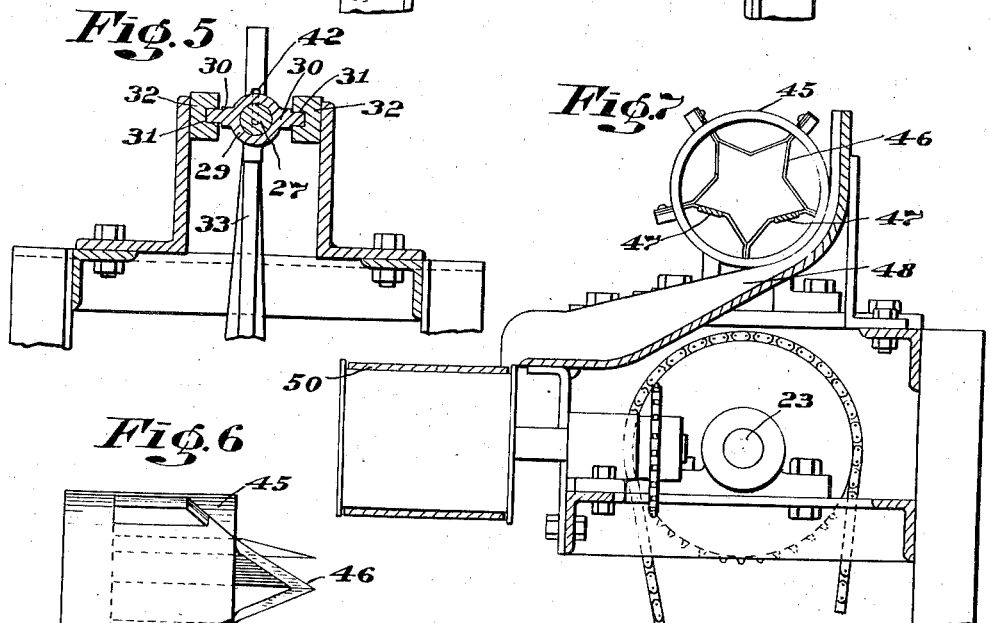
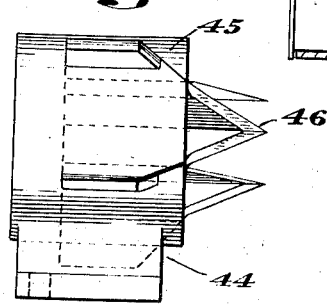
INVENTORS
MARSHALL C. HJELTE
FRANCIS N. TODD
BY
Edgar H. Kent
ATTORNEY June 4, 1940.  M. C. HJELTE ET AL  2,203,627
FRUIT CUTTING MACHINE
Filed Nov. 30, 1938  5 Sheets-Sheet 5
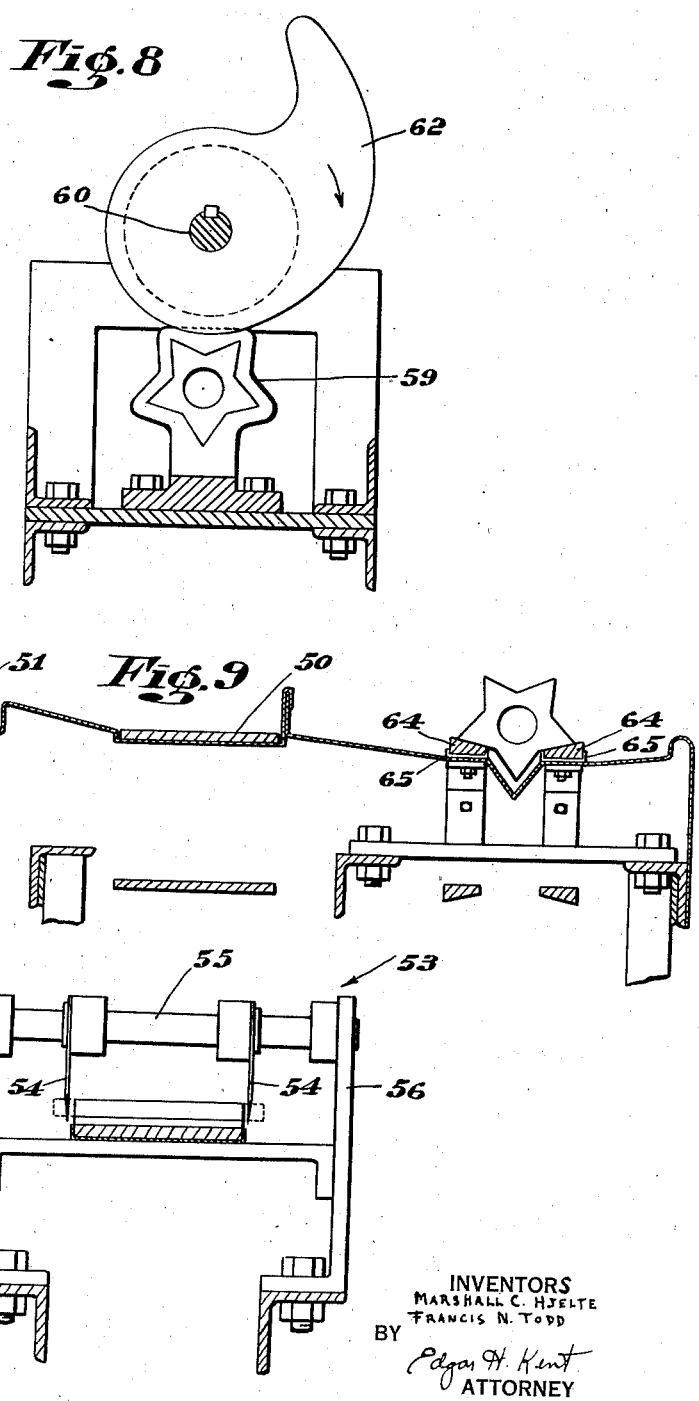
INVENTORS
MARSHALL C. HJELTE
FRANCIS N. TODD
BY
Edgar H. Kent
ATTORNEY

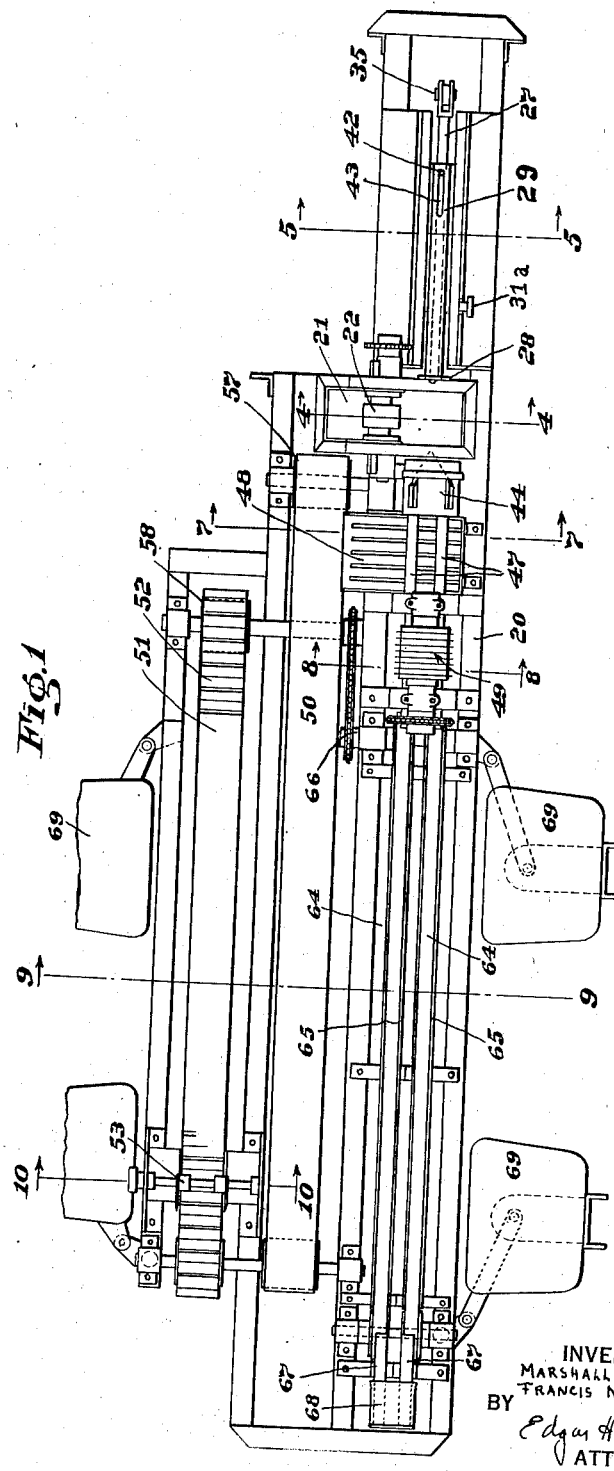

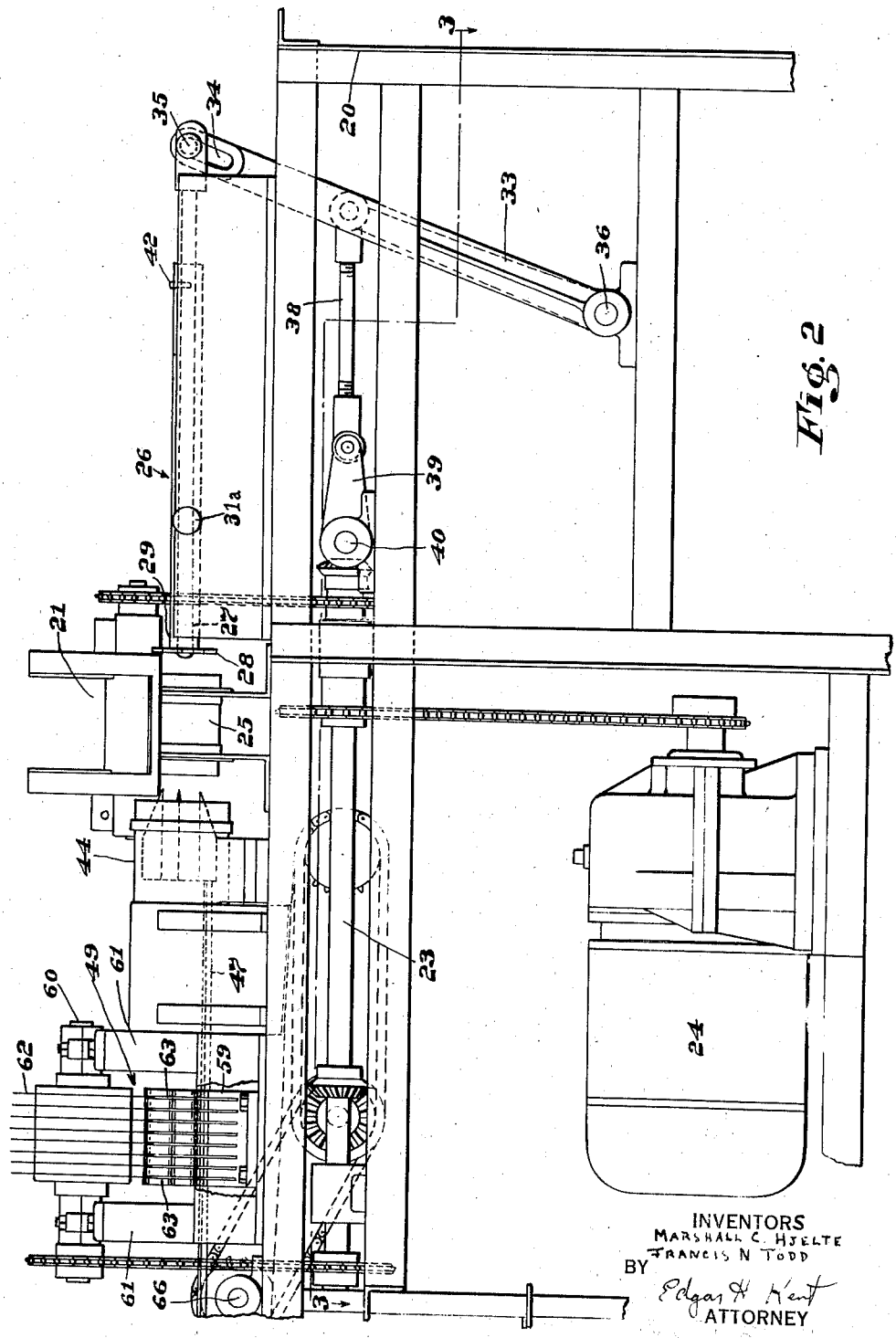

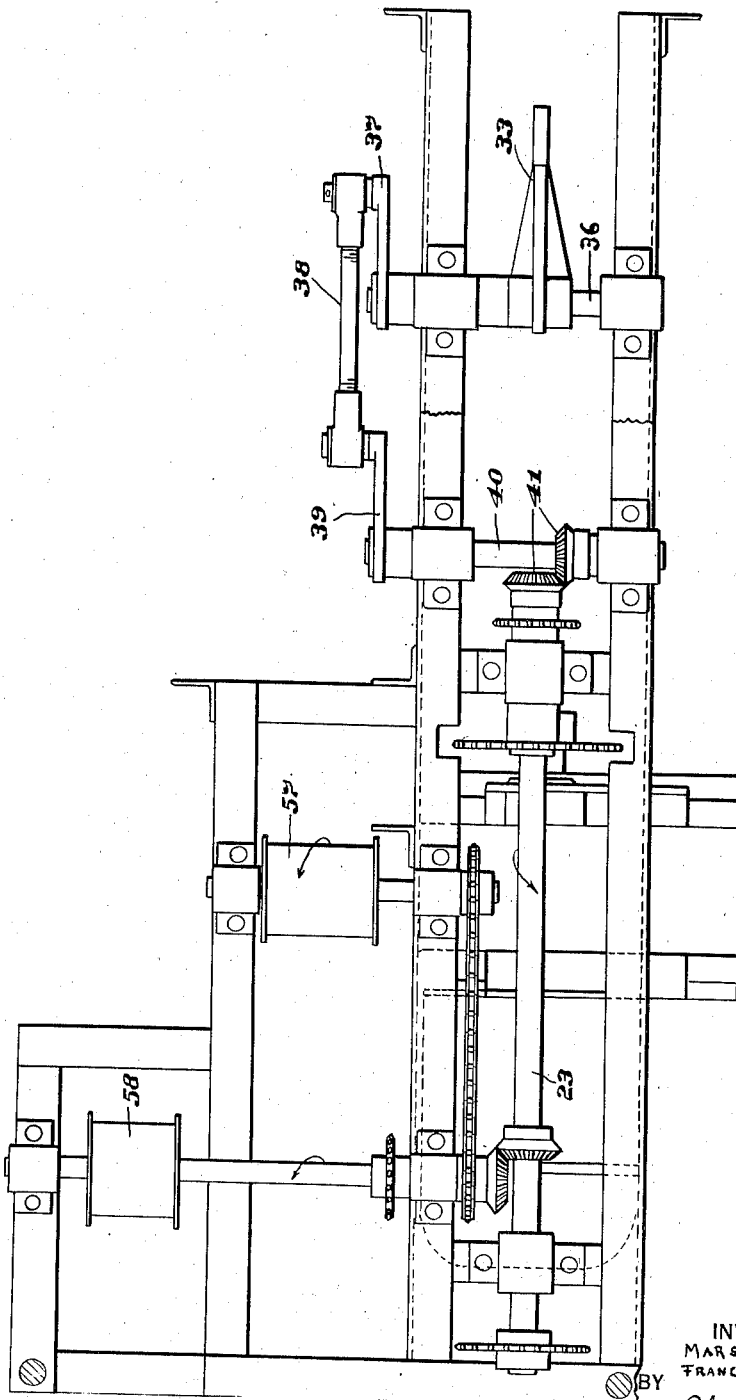

UNITED STATES PATENT OFFICE 2,203,627

FRUIT CUTTING MACHINE

Marshall C. Hjelte and Francis N. Todd, Honolulu, Territory of Hawaii, assignors to Hawaiian Pineapple Company, Limited, Honolulu, Territory of Hawaii, a corporation of the Territory of Hawaii Application November 30, 1938, Serial No. 243,053

7 Claims. (Cl. 146—6)

The present invention relates to fruit packing, particularly pineapple packing, and to novel apparatus for use in preparing the fruit for packing.

It is a specific object of the invention to provide such apparatus for automatically separating longitudinal strips or bars from the exterior of a fruit or sized fruit block and cutting the remaining portion of the fruit transversely into flat slices. The bars removed by the apparatus may be of such form as to provide a shape of pleasing design for the slices, for example, a star shape such as is shown in United States Patent No. 2,053,238. The cut bars and slices may be packed together in a single container, as in the aforementioned patent, and to this end the present invention provides apparatus for properly sizing the cut bars and for conveying the slices and bars separately to points conveniently located for their reassembly into the container.

In the drawings, which illustrate a preferred form of apparatus of the invention:

Fig. 1 is a top plan view of the apparatus;

Fig. 2 is a side elevation of the right-hand end of the apparatus shown in Fig. 1;

Fig. 3 is a part plan view on the section 3—3 of Fig. 2;

Fig. 4 is a partial section on the line 4—4 of Fig. 1, showing the feed chute and gate;

Fig. 5 is a partial section on the line 5—5 of Fig. 1, showing the push rod, guide and lever mechanism;

Fig. 6 is a side elevation of the cutter knife assembly;

Fig. 7 is a partial section on the line 7—7 of Fig. 1, showing the knife assembly, the bar discharge chute and the conveyor belt which receives the bars;

Fig. 8 is a partial section on the line 8—8 of Fig. 1, showing the slicer assembly;

Fig. 9 is a partial section on the line 9—9 of Fig. 1, showing the slice conveying belts and the bar conveying and sizing belts;

Fig. 10 is a partial section on the line 10—10 of Fig. 1, showing the bar sizing knife assembly.

The embodiment of the invention shown comprises in general mechanism for cutting fruit blocks into longitudinal bars and transverse slices, for transferring the bars and slices separately through inspection lines to points conveniently located for packing, and for sizing the bars as desired for packing purposes. The particular arrangement of cutting mechanism shown for purposes of illustration is adapted to the production of star shaped slices and wedge shaped bars, which may be packed together in a single container in the manner shown in Patent No. 2,053,238 above referred to. However, it is to be understood that by slight changes in the cutting mechanism as shown, the apparatus of the invention may be made to produce other shapes of bars and slices and the invention is therefore not limited to the particular arrangement of cutting mechanism illustrated.

In the apparatus shown in the appended drawings, there is mounted on a suitable rigid frame 20 an inclined feed chute 21 which has near its base a revolving gate 22 driven by chain and sprocket connections from the main drive shaft 23, which is suitably connected to an electric motor 24 or other suitable source of power. As shown in Fig. 4, previously cored and sized fruit blocks, shown in the drawings as cylinders, are fed into the machine by gravity through the chute 21, the revolving gate 22 permitting only one fruit block at a time to drop onto receiving station 25 in front of reciprocating pusher assembly 26.

Pusher assembly 26 is composed of a centering rod 27 having a rounded end or nose and a pusher plate 28 which is carried by a sleeve 29. Sleeve 29 has guides 30 affixed to its sides which permit it to slide in corresponding crosshead grooves 31 of rails 32 affixed to the frame 20. Pusher plate 28 has a peripheral shape corresponding to that assumed by the fruit block upon removal of the bars, as it is intended to pass within and through the bar removal knife assembly.

As shown in Figs. 1 to 3, centering rod 27 is reciprocated longitudinally by lever 33 which has a slot 34 at its upper end in which rides a pin 35 fixed to the rear end of the rod 27. At its lower end, lever 33 is keyed to a floating shaft 36 which has keyed at one end a crank arm 37. Crank arm 37 is loosely connected through adjustable link 38 to crank shaft 39 keyed to counter shaft 40 which is driven by mitre gears 41 from the main shaft 23. Reciprocating motion for the sleeve 29 and its attached pusher plate 28 is achieved through contact of pin 42 on centering rod 27 with the ends of slot 43 in sleeve 29.

As the fruit block leaves the revolving gate 22, it drops into position in front of pusher plate 28 with its core hole longitudinally aligned with centering rod 27. The centering rod reciprocating mechanism is timed with relation to the gate operating mechanism to move rod 27 forwardly from its extreme rearward position shown in Fig. 2 at the moment a fruit block is positioned in front of plate 28 so that rod 27 passes into the core hole of the fruit block. Pusher plate 28 remains stationary, being restrained from longitudinal movement by spring loaded ball pin 31a in one of the rails 32, seating in a corresponding depression in guide 30, until pin 42 on rod 27 contacts the left hand end of slot 43 (Fig. 1) and, together with sleeve 29, is then moved forwardly with rod 27 by the rod reciprocating mechanism to force the fruit block through the bar removal die 44. When pusher plate 28 has passed entirely through the knife assembly, the rod reciprocating mechanism reverses, withdrawing rod 27 from the core hole of the fruit block, during which interval pusher plate 28 is again restrained from longitudinal movement by spring loaded ball pin 31a seating in a second corresponding depression in guide 30, and, upon contact of pin 42 with the right hand end of slot 43, withdraws pin, sleeve and pusher plate to the extreme rearward position of Fig. 2, when the reciprocating mechanism again reverses and the cycle is repeated on a new fruit block.

As shown in Figs. 6 and 7, the bar cutter or die 44 comprises a housing 45 mounted on frame 20 forwardly of block receiving station 25 and of sufficient size to permit endwise passage therethrough of the fruit blocks and a plurality of knives 46 secured longitudinally of the inner periphery of the housing. The cutting ends of the blades are disposed rearwardly of the housing. The particular shape and arrangement of blades shown is such as to form within the housing a central longitudinal star-shaped passage and a plurality of wedge-shaped passages between said star-shaped passage and the housing. When a fruit block is forced endwise coaxially through the die, the blades as shown cut wedge-shaped bars from the periphery which enter the wedge-shaped passages under the influence of pusher 26, leaving a star-shaped core which is pushed completely through the central star-shaped passage by the pusher plate 28. The bars are forced forwardly out of the wedge-shaped passages by the next following fruit block as it is pressed through the die.

As the shaped core of the fruit block leaves the knives 46, it comes to rest on rails 47, these rails being spaced to accommodate one point of the star-shaped core between them and to support the lower edges of adjacent points. These rails 47 extend forwardly over a chute 48 to the rear of slicer 49 mounted on frame 20 coaxially of rod 27. The fruit bars projected forwardly out of the die 44 fall into chute 48 at the forward end of the knife housing 45 and are guided by the chute onto conveyor belt 50. The bars are carried forwardly along the machine by the belt 50 and are transferred manually by operators to the bar sizing belt 51 beyond and parallel to the belt 50. The bar sizing belt is formed with cross slots 52 in each of which one bar is placed with its ends extending beyond the sides of the belt. These slots hold the bars while they are being conveyed to and through the bar sizer 53.

The bar sizer 53 comprises two spaced parallel knives 54, one at each side of the belt 51, mounted on a shaft 55 secured in standards 56 fixed to the frame. Knives 54 extend at right angles to the grooves 52 and have their cutting edges opposed to the direction of travel of the belt 51 so that the knives pass transversely through the ends of each fruit bar as it is carried along by the belt, thus cutting the bars to uniform predetermined size. Knives 54 may be slidably mounted on the shaft 55 to enable lateral adjustment of the knives and shaft 55 may be turned by the knurled handle 55a for adjustment of the position of the knives in their vertical planes. After sizing by the knives 54, the fruit bars are discharged by the belt 51 onto a table (not shown) preparatory to being packed.

Driving pulleys 57 and 58 for the belts 50 and 51 are actuated from the main drive shaft 23 by suitable connections such as those illustrated in Fig. 3.

As shown in Figs. 2 and 8, slicer 49 comprises a slicer head 59 having a central longitudinal cavity shaped to fit over the periphery of the cut fruit block, star-shaped in the embodiment illustrated. A shaft 60 is rotatably mounted in standards 61 secured to the frame at each end of slicer head 59 and extends longitudinally above the slicer head parallel to its longitudinal axis. Shaft 60 has secured thereto a plurality of parallel slicing knives 62, extending at right angles to the axis of shaft 60 and spaced apart a predetermined regular distance corresponding to the size of slice desired. Slicer head 59 is provided with a series of transverse grooves 63, one for each knife 62, to permit the knives 62 to pass through it and a fruit block within it upon rotation of the shaft 60. Shaft 60 may be operated from main drive shaft 23 by chain and sprockets as shown at the left hand end of Fig. 2.

The action of pusher 26 in forcing a fruit block through the bar removal knives 46 advances a previously cut block along the rails 47 into the slicer head 59. Slicer knives 62 are then passed through the slicer head and the fruit block while the pusher 26 is being retracted to its rearward position, the drive for the shaft 60 and the reciprocating mechanism for the pusher 26 being properly synchronized to this end. After the slicer knives have moved out of the fruit, the fruit slices are forced out of the forward end of the slicer head by the next following fruit block which is moved forward by the action of pusher 26 in forcing a new fruit block through the bar removal knives.

The sliced fruit passes out from the slicer head 59 onto two spaced parallel belts 64 running in guides 65 (see Figs. 1 and 9) and driven by pulleys mounted on a drive shaft 66. Drive shaft 66 may be actuated from the main drive shaft 23 by sprocket and chain connections to the shaft of driving pulley 58, as indicated in Figs. 1–3. The belts 64 carry the fruit slices in spaced groups forwardly past inspectors and discharge them over guides 67 at the forward end of the machine where they may be slid into containers 68 by an operator. Adjustable chairs 69 may be provided on the frame 20 beside the belts 64 and 51 for the operators.

After a predetermined number of the shaped slices have been packed in a container, other operators may pack sized bars in the same container in the manner illustrated in Patent No. 2,053,238, if desired.

By changes in the shape of the bar removal knife assembly and the slicer head, it is obvious that the apparatus illustrated may be made to produce various shapes of bars and slices, and to this end we may provide for each machine a series of bar cutter dies and correspondingly shaped slicer heads that may be used interchangeably. It is also obvious that the apparatus will accommodate, or by simple alterations can be made to accommodate, other shapes of fruit blocks besides the cylindrical form shown.

In certain cases, the bar sizing apparatus may be unnecessary, as where the containers used are sufficiently large to accommodate the bars as cut by the bar removal knives or where it is not desired to pack the bars as such, and in such cases the bar sizer and sizing belt may be dispensed with and the conveyor belt permitted to carry the bars into a suitable receptacle adjacent the idler pulley at the forward end of the belt.

It will be understood that these and other modifications of the details of the preferred embodiment of the invention shown and described herein may be made without departing from the spirit and scope of the invention.

We claim:

1. In apparatus for preparing cored and sized fruit blocks for packing, a die member adapted to sever bars longitudinally from the periphery of a said block forced axially therethrough to leave a complementary shaped central portion, and means for automatically feeding the blocks successively uniformly axially through said die member, said means comprising a centering rod adapted to fit freely within the core hole of a said block, means for automatically reciprocating said rod through the die from a position removed from the cutting end of the die, means operative between successive reciprocations of said rod to feed automatically a said block between the die and the end of said rod with the core hole of the block in axial alignment with said rod, and pusher means engageable with said block on entry of said rod into the core hole thereof to cause said block to advance forwardly with said rod through said die.

2. In apparatus for preparing cored and sized fruit blocks for packing, a die comprising a plurality of fixed annularly disposed cutters presenting cutting edges at an end thereof, said cutters adapted to sever bars longitudinally from the periphery of a said block forced axially through said die to leave a complementary shaped central portion, and means for automatically feeding the blocks successively uniformly axially through said die, said means comprising a centering rod adapted to fit freely within the core hole of a said block, means for automatically reciprocating said rod through the die from a position removed from the cutting end of the die, means operative between successive reciprocations of said rod to feed automatically a said block between the die and the end of said rod with the core hole of the block in axial alignment with said rod, and pusher means engageable with said block on entry of said rod into the core hole thereof to cause said block to advance forwardly with said rod through said die.

3. In apparatus for treating cored and sized fruit blocks, the combination of a die and means for automatically forcing the fruit blocks successively through the die in uniform axial relation therewith, said means comprising a pusher plate adapted to reciprocate through the die from an initial position removed from the cutting end of the die, an aperture in said plate, a rod having an end portion of smaller diameter than the core holes of the fruit blocks adapted to be projected and retracted through the aperture in said plate, means to position a fruit block between said plate in initial position and the cutting end of the die with the core hole of said block in axial alignment with said rod, and means to thereupon automatically successively project said rod into the core hole of said block, advance said plate and rod through the die, retract said rod from the core hole of said block through the plate and return the plate and rod to initial position.

4. In apparatus for preparing cored and sized fruit blocks for packing, a die comprising a plurality of fixed annularly disposed trough-shaped cutters presenting cutting edges at an end thereof, said cutters adapted to sever bars longitudinally from the periphery of a said block forced axially through said die to leave a complementary shaped central portion, and means for automatically feeding the blocks successively uniformly axially through said die, said means comprising a centering rod adapted to fit freely within the core hole of a said block, means for automatically reciprocating said rod through the die from a position removed from the cutting end of the die, means operative between successive reciprocations of said rod to feed automatically a said block between the die and the end of said rod with the core hole of the block in axial alignment with said rod, and pusher means engageable with said block on entry of said rod into the core hole thereof to cause said block to advance forwardly with said rod through said die.

5. In apparatus for preparing cored and sized fruit blocks for packing, the combination of a die adapted to cut blocks forced axially thereof into peripheral longitudinal bars and a complementary shaped central portion and means for automatically forcing the blocks successively through the die in uniform axial relation therewith, said means comprising a rod adapted to fit freely within the core hole of a fruit block, means mounting said rod to reciprocate axially through the die from an initial position removed from the cutting end of the die, means to automatically position a fruit block between the end of said rod in initial position and the cutting end of said die with the core hole of said block in axial alignment with said rod, means to thereupon shift said rod successively forwardly into the core hole of said block, forwardly through the die, rearwardly out of the core hole of said block and rearwardly through the die to initial position, and pusher means cooperating with said rod and automatically movable with said rod during part only of its cycle to cause said block to partake of the forward motion only of said rod through the die.

6. In apparatus for treating cored and sized fruit blocks, a die comprising a plurality of longitudinally extending annularly arranged trough-shaped knives with cutting edges at an end thereof, feeding means for automatically positioning the blocks successively uniformly adjacent the cutting end of the die, pusher means to force the blocks positioned by said feeding means uniformly axially through the die to remove bars uniformly from the periphery of each block, a slicer head in forward alignment with the die and having a cavity therein shaped to receive a fruit block after cutting by the die, a plurality of slicer blades adjacent said head and disposed to operate transversely through the cavity therein, means to transfer blocks from said die to slicing position in said head during forward projection of a succeeding block through the die, and means to operate the slicer blades through said slicer head during retraction of said pusher means.

7. In apparatus for the purpose described, a die adapted to cut blocks forced axially thereof into peripheral longitudinal bars and a complementary shaped central portion, a slicer head in forward alignment with said die adapted to receive said shaped central portions of said blocks cut by said die, knife means adapted to slice transversely a fruit block in said head, pusher means to project the blocks forwardly through said die at regular intervals, slide means connecting said die and slicer head in such manner as to cause the shaped central portion of each block cut by said die to be advanced to slicing position in said slicer head by the forward projection of a succeeding fruit block through the die, and means to operate said knife means to slice a shaped central portion of a fruit block in said head during retraction of said pusher means.

MARSHALL C. HJELTE.
FRANCIS N. TODD.